United States Patent [19]
Lowe

[11] Patent Number: 6,098,970
[45] Date of Patent: Aug. 8, 2000

[54] SPRING BREAKAGE SAFETY SYSTEM

[75] Inventor: Winston H. H. Lowe, Sunnyvale, Calif.

[73] Assignee: Winston Lowe, Sunnyvale, Calif.

[21] Appl. No.: 08/935,040

[22] Filed: Sep. 22, 1997

[51] Int. Cl.$^7$ ....................................................... F16F 1/12
[52] U.S. Cl. ............................. 267/179; 267/169; 267/74
[58] Field of Search ................................... 267/169, 179, 267/33, 166.1, 167, 69, 73, 74

[56] References Cited

U.S. PATENT DOCUMENTS

| | | | |
|---|---|---|---|
| 1,598,480 | 8/1926 | Deal | 267/179 |
| 3,779,537 | 12/1973 | Kalister | 267/179 |
| 3,847,380 | 11/1974 | Kearns | 267/179 |
| 3,862,751 | 1/1975 | Schwaller | 267/179 |
| 3,958,367 | 5/1976 | Fairman | 49/197 |
| 4,757,853 | 7/1988 | Price | 160/191 |
| 4,856,765 | 8/1989 | Kohno | 267/169 |
| 4,869,473 | 9/1989 | Giovanni | 267/179 |
| 5,246,215 | 9/1993 | Takamura et al. | 267/179 |

FOREIGN PATENT DOCUMENTS

| 0239446 | 9/1986 | Germany | 267/169 |
|---|---|---|---|

Primary Examiner—Matthew C. Graham
Attorney, Agent, or Firm—Kenneth C. Brooks

[57] ABSTRACT

A spring having a helical body with opposed ends and two flexible safety cables each of which is coupled to one of said opposed ends, with the two flexible cables extending in opposite directions pass the center of the helical body, terminating in an attachment thereto. The helical body includes a plurality of coils with one end of each of the cables being coupled to one of the plurality of coils. The attachment includes an elliptically shaped journal through which one of the plurality of coils passes, thereby pivotally attaching the cable thereto. In one embodiment, a threaded boss is disposed at each end of the helical body. The threaded boss has a plurality of recesses, each of which is adapted to receive on of the plurality of coils. In this fashion, the threaded boss threadably engages the helical body.

6 Claims, 6 Drawing Sheets 6,098,970

SPRING BREAKAGE SAFETY SYSTEM

TECHNICAL FIELD

The present invention pertains to coupling mechanisms for doors, lids, covers and the like that employ springs to aid opening and closing. Specifically, the present invention pertains to a safety system for coupling mechanisms ideally suited for use with counterbalanced helical springs.

BACKGROUND ART

Coupling mechanisms employing counterbalanced coil springs are well known in the art. Notoriously well known systems of counterbalanced coil springs are used with garage doors to assist an operator in opening and closing of the door. Such springs are utilized even when motorized automatic garage door openers are employed. Typically, these springs are tension springs which, when stretched, are placed under great tension, i.e., store a great amount of potential energy. Were one of these springs to break, or segment, due to fatigue, injury could result, especially if the spring were to break when under tension. The potential energy stored in the spring can rapidly convert to kinetic energy by the spring segments traveling through open space at a great velocity. This poses a great risk of grievous bodily harm to an operator. For example, were a spring which is attached to a lid or door to break, the lid or door could come crashing down on the user.

Prior art attempts have been made to reduce the likelihood of injury due to spring failure. U.S. Pat. No. 3,958,367 to Fairman discloses an overhead garage door spring safety device for use in combination with an elongated coil spring of the type typically employed on garage doors. The safety device includes an elongated flexible member extending longitudinally through the spring. The spring is positioned between the opposed ends of the flexible member. One end of the flexible member is fixedly attached to a first support, with the remaining end attached to a second support via a resilient member. In this fashion, were the spring to segment, the fragments would be maintained in the proximity of the flexible member.

U.S. Pat. No. 4,757,853 to Price discloses a safety device very similar to Fairman except that the ends of the spring are covered by a tubular shaped member having an end cap. Each end of the spring is secured to a support through holes in the end caps and additional holes are provided to allow the flexible member to pass therethrough. In this fashion, fragments of a failed spring are retained by either the flexible member or the tubular member.

What is needed, however, is a spring safety system that retains some amount of potential energy stored by a spring that segments.

SUMMARY OF THE INVENTION

A spring of the type having a helical body with opposed ends features two or more flexible, but high strength, safety cables, coupled to one of the opposed ends of the spring. Preferably there are two flexible cables, each of which extends in opposite directions pass the center of the spring, terminating in an attachment thereto. The helical body includes a plurality of coils with one end of each of the cables being coupled to one of the plurality of coils. The attachment includes an elliptically shaped journal through which one of the plurality of coils passes, thereby pivotally attaching the cable thereto. In one embodiment, a threaded clevis is disposed at each end of the helical body. The threaded boss has a plurality of recesses, each of which is adapted to receive one of the plurality of coils. In this fashion, the threaded clevis threadably engages the helical body.

BEST MODE FOR CARRYING OUT THE INVENTION

Figure 1B:
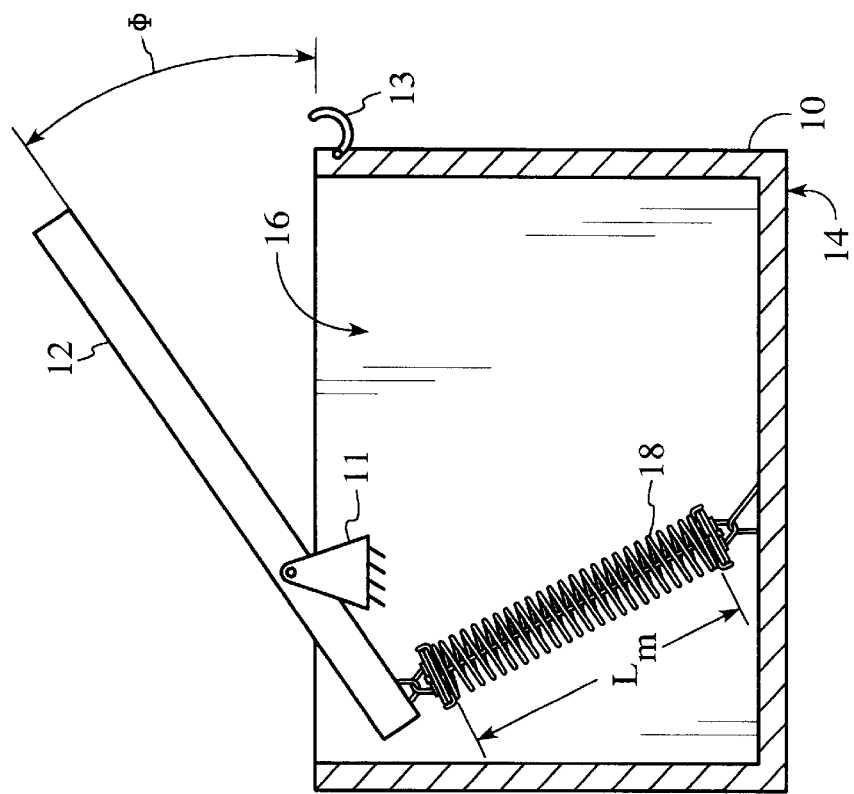
FIG. 1B is a cross-sectional side view of a centrifuge housing, shown in FIG. 1A, with the lid shown in an open position.
Figure 1A:
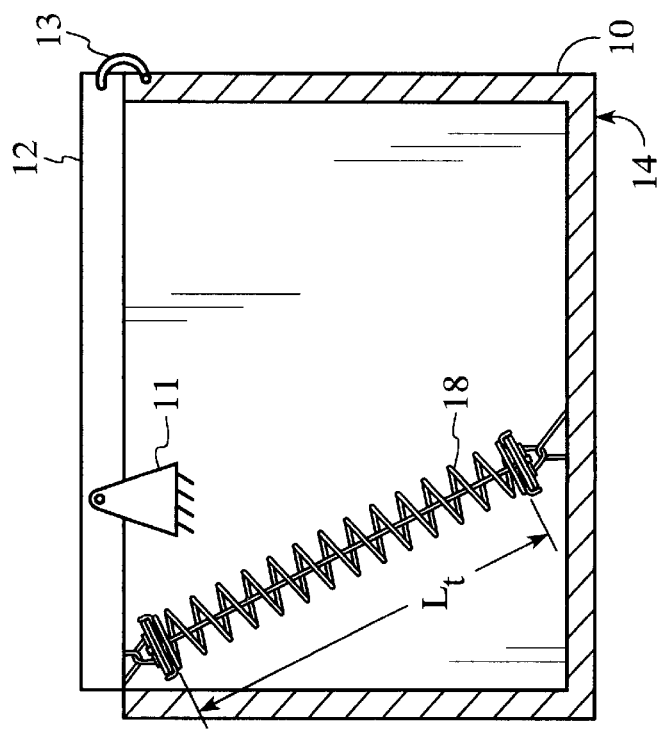
FIG. 1A is a cross-sectional side view of a centrifuge housing, with a lid shown in a closed position, employing a helical spring retraction system in accord with the present invention.

Referring to FIGS. 1A and 1B, a exemplary coupling mechanism employing a counterbalanced helical spring shown coupled between a housing 10 and a lid 12. The housing 10 is of the type typically used to contain a centrifuge chamber (not shown) and a centrifuge rotor (not shown). The housing 10 has a bottom wall 14 and an opening 16 disposed opposite to the bottom wall 14. The lid 12 is pivotally attached to the housing 10 using a suitable hinge 11 with a spring 18 coupled to the lid 12 in a counter-balanced fashion so that the lid 12 may be positioned to selectively cover the opening 16. The counter-balanced spring 18 is of the type having a helical body formed from a plurality of coils 20 that define a cylindrical throughway 21, shown more clearly in FIG. 2. The spring 18 is coupled between the back edge of lid 12 and the bottom wall 14 of the housing 10.

Figure 2:
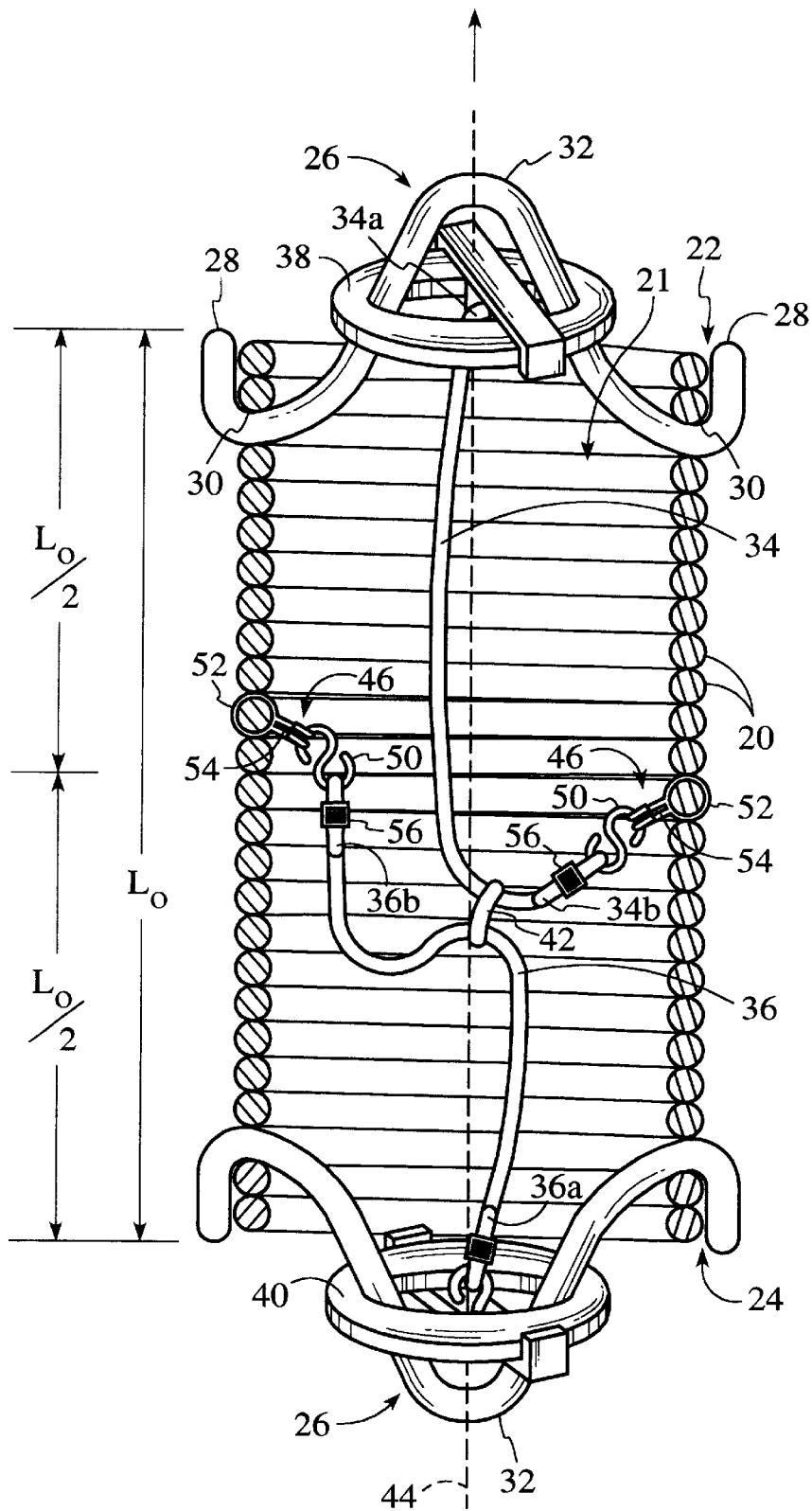
FIG. 2 is cross-sectional view of a typical helical spring employed in FIG. 1 showing the spring breakage safety system coupled to the spring when the spring is not under tension.

Referring to FIG. 2, disposed at each of the opposed ends 22 and 24 of the spring 18 is a clevis 26. The clevis 26 includes two spaced-apart peripheral members 28 having a recess 30, with a hook member 32 disposed therebetween. The peripheral members 28 are attached to the spring 18 so as to be wedged between two adjacent coils 20. In this fashion, one or more coils 20 are retained in the recess 30, and the hook member 32 extends from the spring 18 in a direction away from the opposing end.

Referring to FIGS. 1A, 1B, 2 and 3, the spring 18 is attached between the housing 10 and the lid 12 so as to be under tension when the lid 12 covers the opening 16, via hook member 32 disposed at the opposed ends 22 and 24.

When under tension, the spring 18 has a length $L_t$. The spring 18 is relaxed, i.e., under less tension, when the lid 12 forms an oblique angle Φ with respect to the opening 16. In this position, the length of the spring is at a minimum, $L_m$, with the angle Φ typically being in the range of 90° to 45°. A problem encountered with the counterbalanced spring 18 is the risk of injury posed by the same, were the spring to undergo catastrophic failure. Specifically, the spring 18 could segment, due to fatigue from excessive wear, causing the lid 12 to slam shut. This could result in grievous bodily injury to a person who, for example, rests their hand on the housing 10.

To overcome the aforementioned risk of injury, the spring 18 is provided with a safety system that includes two flexible safety cables 34 and 36, shown more clearly in FIG. 2. The cables 34 and 36 are disposed in the throughway 21 of the spring 18. One terminus 34a of cable 34 is coupled to a transom system 38 that extends across the hook member 32, disposed proximate to end 22 of the spring 18. The cable 34 extends from the transom 38 towards the opposing end 24 of the spring, with the remaining terminus 34b of cable 34 being coupled to one of the plurality of coils 20 of the spring 18. One terminus 36a of cable 36 is coupled to the transom system 40 that extends across the hook member 32, disposed proximate to the end 24 of the spring 18. The cable 36 extends from the transom system 40 toward the opposing end 22, with the remaining terminus 36b of cable 36 being coupled to one of the plurality of coils 20.

Figure 3:
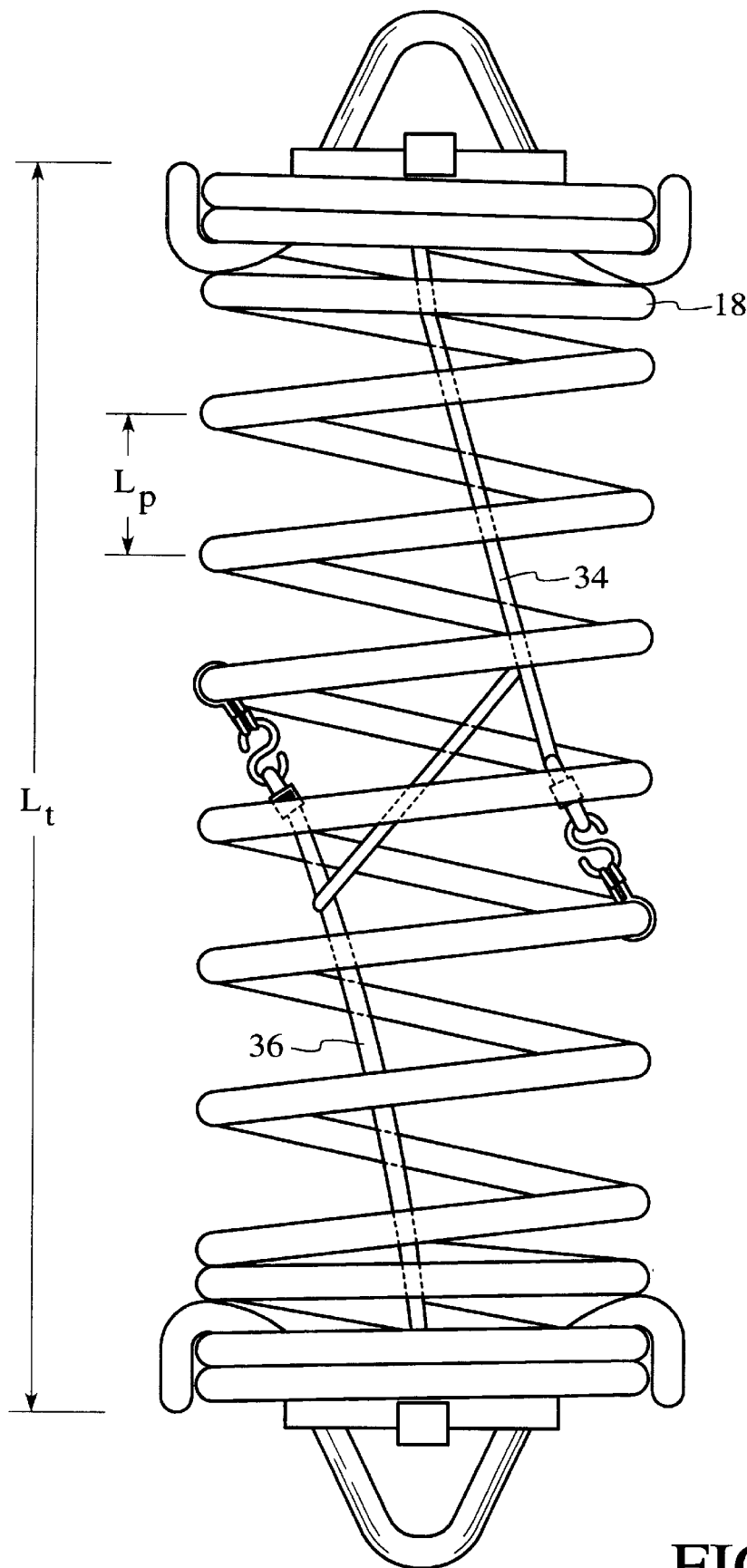
FIG. 3 is a side view of the helical spring, shown in FIG. 2, with the spring breakage safety system coupled thereto when the spring is under tension.

Referring to FIGS. 2 and 3, it is important to allow the spring 18 to move between the two lengths $L_m$ and $L_t$. The cables' 34 and 36 length, therefore, must be established so that spring movement between the two lengths $L_m$ and $L_t$ is facilitated, while the aforementioned risk of injury is reduced. To that end, the cables 34 and 36 must have a preferred length defined as follows:

$$L_c = L_t/2 + 2.5L_p$$

where $L_c$ is the preferred length for both cables 34 and 36, $L_t$ is the length as defined above, and $L_p$ is the length between two adjacent coils 20 when the spring 18 has the length $L_t$.

It is important, however, that the cables 34 and 36 are positioned in the throughway 21 so as not to become pinched between two adjacent coils 20 when the spring moves between $L_m$ and $L_t$. This could cause premature wear in the cables, causing the same to break when subjected to tension. To prevent the cables 34 and 36 from being pinched by the coils 20, a resilient member 42 couples the two cables 34 and 36 together. When the spring has the length $L_m$, the length of the resilient member 42 is at a minimum and is located along a longitudinal axis 44 of the spring 18. As the spring 18 comes under tension, the resilient member 42 extends outwardly, shown in FIG. 4. It is preferred that termini 34b and 36b are pivotally coupled to the coils 20, shown more clearly in FIG. 2. In this fashion, the cables 34 and 36 may be provided with a greater length, while preventing the same from being pinched between two adjacent coils. To that end, termini 34b and 36b are each coupled to one of the plurality of coils 20 via an attachment 46.

Each attachment 46 includes a sheet metal clamp and an S-link 50. Preferably the sheet metal clamp has an anchor 52, through which one of the coils 20 pass. A tab 54 extends radially outward from the anchor 52 and includes an aperture (not shown) through which one end of the S-link 50 passes. Each termini 34b and 36b includes a loop formed by doubling-back the respective cable 34 or 36 onto itself and fixing it thereto with a crimped ferrule 56. The end of the S-link 50, opposite to the tab portion 54 passes through the loop in one of the termini 34b or 36b. In a similar fashion termini 34a and 36a may be coupled to transom systems 38 and 40.

Figure 4:
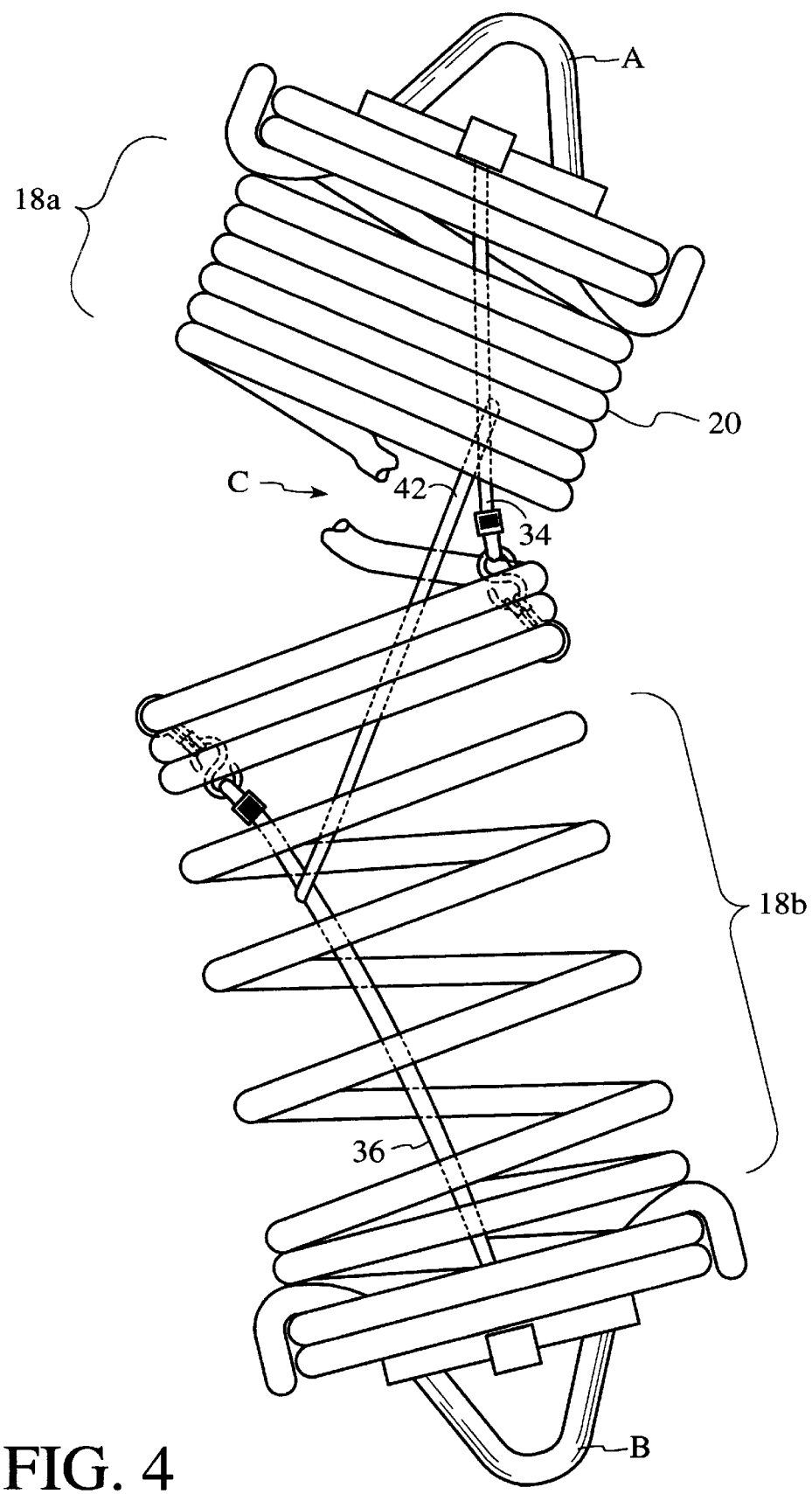
FIG. 4 is a side view of the helical spring, shown in FIG. 3, with the spring breakage safety system coupled to a spring undergoing catastrophic failure.

Referring to FIGS. 1A, 1B and 4, with the lid 12 in the opened position and attached to spring at point A, with the bottom wall 14 attached thereto at point B, the lid 12 would start to close rapidly were the spring 18 bifurcate into two sections 18a and 18b. This would result in the conversion of the spring's potential energy into kinetic energy, in the lid 12, when one of the coils 20 segments at point C. After a predetermined amount of energy release, the cables 34 and 36, as well as the resilient member 42, would be stretched substantially taut. Thereafter, the resiliency of segment 18b would exert a resisting force on the movement of the lid 12 via cable 34 and segment 18b. In this fashion, the rate at which the lid 12 falls is reduced by reducing the kinetic energy in the lid 12. The amount of kinetic energy which is dissipated is a function of the length of cables 34 and 36, the point at which the spring 18 segments and the physical properties of the spring 18.

An advantage provided by the anchor 52 is that the coupling of the attachment 46 to the coils 20 is not easily compromised when the spring 18 undergoes catastrophic failure. Specifically, were the spring 18 to segment, as discussed above, at a point proximate to one of the attachments, the rotational movement between the segments 18a and 18b could cause the attachment to decouple from one of the coils 20 that pass therethrough. Specifically translational motion occurs between the aforementioned coil 20 and the attachments 46 in a direction parallel to the rotational movement. To prevent the aforementioned decoupling, the metal clamp is provided with an anchor 52 having a sufficient length along the longitudinal axis thereof that the coil 20 becomes wedged therein when the aforementioned translational movement occurs.

Figure 7:
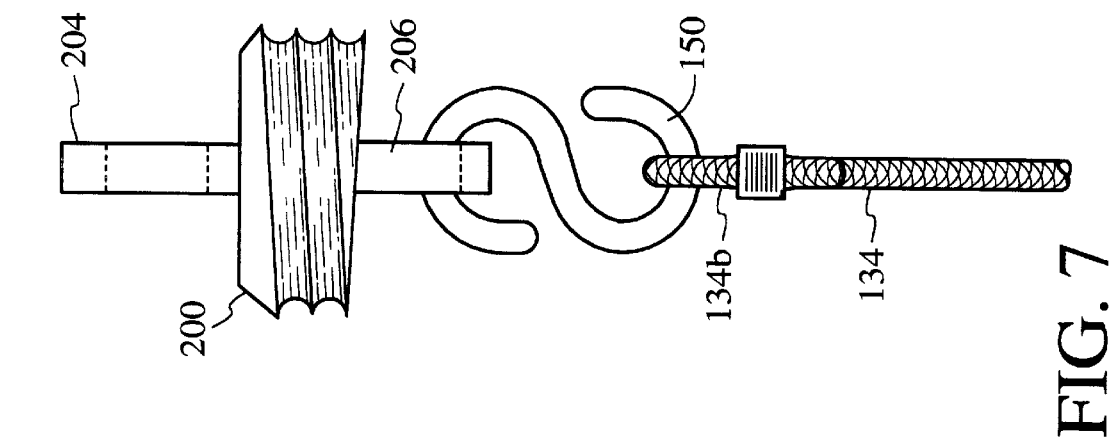
FIG. 7 is a plan view of the threaded boss shown in FIG. 6, rotated 90°.
Figure 6:
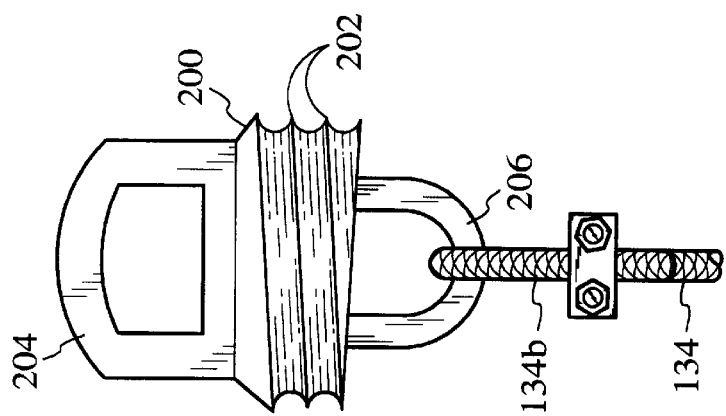
FIG. 6 is a detailed plan view of the threaded boss shown in FIG. 5.
Figure 5:
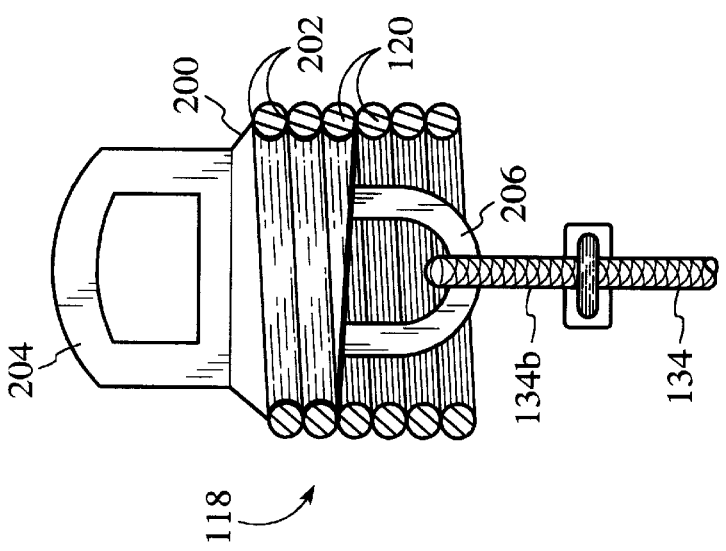
FIG. 5 is a partial cross-sectional view of the spring shown in FIG. 1, employing a threaded boss in accord with an alternate embodiment.

Referring to FIGS. 5, 6 and 7, an alternative embodiment of coupling the cables to the spring 118 is shown with respect to cable 134. Specifically, a threaded boss 200 is shown as including a plurality of threads 202 which are complementary to the pitch of the coils 120 that form the helical body of the spring 118. Extending from the opposed ends of the threaded boss 200 is a closed loop 204 and 206. The boss 200 is threaded into the spring 118 so as to be surrounded by the coils 120 with closed loop 206 extending toward the opposite end of the spring 118. In this fashion, cable 134 may be directly coupled thereto by the loop formed into the cable 134 at the termini 134b, as shown in FIG. 6. Alternatively, the cable 134 may be coupled to the threaded boss 200 via S-link 150, as shown in FIG. 7.

Referring again to FIG. 5, it was discovered that the threaded engagement between the boss 200 and the spring 118 is maintained when the spring 118 is under tension. The coils disposed proximate to the opposed ends of the spring 118 do not undergo a substantial amount of separation, thereby reducing the probability of the threaded boss 200 decoupling from the spring 118. Although the threaded boss 200 is described as being fitted into the interior of the spring 118, it is possible that the threaded boss thread onto the exterior of the spring so as to encapsulate the end thereof.

Figure 8:
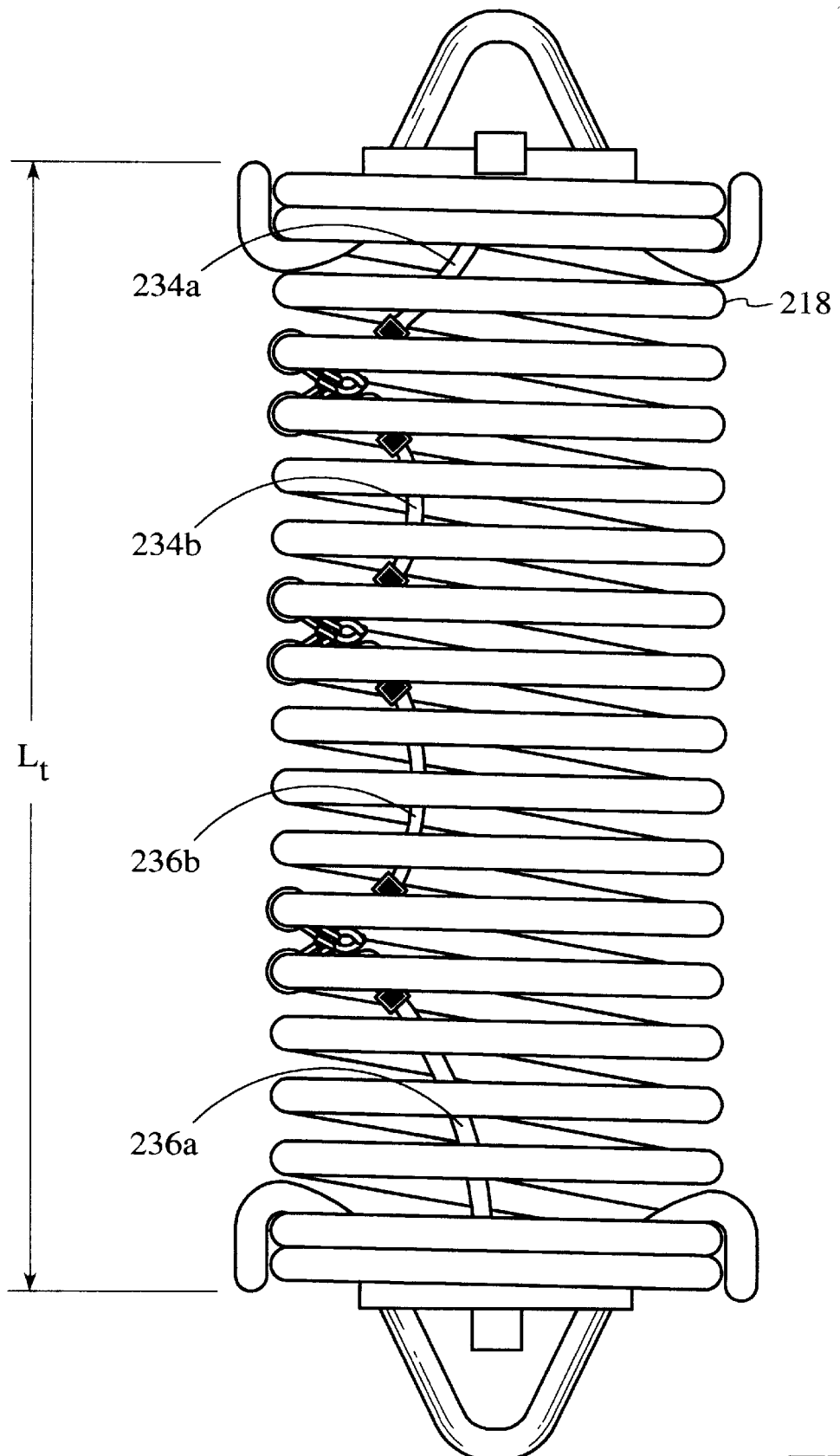
FIG. 8 is a perspective view of the helical spring, shown in FIG. 2, in accord with an alternate embodiment.

Finally, to provide a higher resisting force, additional overlapping safety cables can be installed. In this fashion, the effective working length of the segmented spring would be increased. For example, as shown in FIG. 8, a four-safety-cable system, consisting of 234a, 234b, 236a and 236b, may be employed which would provide the spring 218, were it to segment, with an effective length equal to ¾ the length of the spring 218 before segmentation, i.e., the spring would retain ¾ of its original resisting force. In a similar manner, a three-safety-cable system would provide the spring 218, were it to segment, with ⅔ of the resisting force of the spring 18 measured before segmentation, i.e., the spring 2, once segmented, 18 would have an effective length equal to ⅔ the spring 18's length before segmentation. Thus, the effective length of a spring could be determined as follows:

Effective Spring Length=(no. of cables-1)/(no. of cables).

What is claimed is:

1. A spring of the type having a plurality of coils, defining a helical body with opposed ends, and including two flexible cables, each of which is coupled to one of said opposed ends, with the two flexible cables extending in opposite directions toward the remaining end of the helical body, with another end of each of said cables including an attachment directly coupled to one of said plurality of coils located between said opposed ends.

2. The spring as recited in claim 1 further including a resilient member coupled between said two flexible cables, with each of said two flexible cables having a length Lc defined as follows:

$$L_c=L_i/2+2.5L_p.$$

3. The spring as recited in claim 1 wherein said helical body has a length, with each of said cables extending over one half of said length.

4. The spring as recited in claim 1 wherein said attachment is pivotally coupled to said helical body.

5. The spring as recited in claim 1 wherein said attachment includes a cylindrically shaped journal through which said one of said plurality of coils passes.

6. The spring as recited in claim 1 further including a threaded boss, disposed at each of said opposed ends, and having a plurality of recesses, each of which is adapted to receive on of said plurality of coils, thereby threadably engaging said helical body.

* * * * *